(12) United States Patent  (10) Patent No.: US 7,520,354 B2
Morrow et al.  (45) Date of Patent: Apr. 21, 2009

(54) HYBRID VEHICLE WITH COMBUSTION ENGINE/ELECTRIC MOTOR DRIVE

(75) Inventors: Jon J. Morrow, Neenah, WI (US);
Christopher K. Yakes, Oshkosh, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 269 days.

(21) Appl. No.: 10/137,585

(22) Filed: May 2, 2002

(65) Prior Publication Data
US 2003/0205422 A1   Nov. 6, 2003

(51) Int. Cl.
*B60K 1/00*  (2006.01)
(52) U.S. Cl. ...................... 180/65.4; 180/271
(58) Field of Classification Search ........... 180/65.1, 180/65.2, 65.4, 65.5, 65.6; 280/6.151, 6.155, 280/6.159
See application file for complete search history.

(56) References Cited

U.S. PATENT DOCUMENTS

| | | | |
|---|---|---|---|
| 1,951,089 A | 3/1934 | Fielder | |
| 3,524,069 A | 8/1970 | Stepanov et al. | |
| 3,690,559 A * | 9/1972 | Rudloff | 239/163 |
| 3,764,867 A | 10/1973 | Smith | |
| 3,799,284 A | 3/1974 | Hender | |
| 3,865,209 A | 2/1975 | Aihara et al. | |
| 3,966,067 A * | 6/1976 | Reese | 414/409 |
| 4,021,704 A | 5/1977 | Norbeck | |
| 4,088,934 A | 5/1978 | D'Atre et al. | |
| 4,097,925 A * | 6/1978 | Butler, Jr. | 366/2 |
| 4,113,045 A | 9/1978 | Downing, Jr. | |
| 4,196,785 A | 4/1980 | Downing | |
| 4,292,531 A | 9/1981 | Williamson | |
| 4,319,140 A | 3/1982 | Paschke | |
| 4,336,418 A | 6/1982 | Hoag | |
| 4,347,907 A | 9/1982 | Downing | |
| 4,423,362 A | 12/1983 | Konrad et al. | |
| 4,423,794 A | 1/1984 | Beck | |
| 4,444,285 A | 4/1984 | Stewart et al. | |
| 4,461,988 A | 7/1984 | Plunkett | |
| 4,533,011 A | 8/1985 | Heidemeyer et al. | |

(Continued)

FOREIGN PATENT DOCUMENTS

DE        1 816 183        6/1970

(Continued)

OTHER PUBLICATIONS

Joseph Edward Shigley & John Joseph Uicker, Jr., *Theory of Machines and Mechanisms*, 1980, complete text, McGraw-Hill Book Company, published in the United States.

(Continued)

*Primary Examiner*—Christopher Ellis
*Assistant Examiner*—Bridget Avery
(74) *Attorney, Agent, or Firm*—Foley & Lardner LLP

(57) ABSTRACT

A vehicle including a prime mover, a generator mechanically coupled to the prime mover, a first multi-input drive unit having at least first and second rotational inputs and at least one rotational output wherein the first rotational input is coupled to the prime mover, a first electric motor mechanically coupled to the second rotational input and electrically coupled to the generator and a first pair of vehicle drive wheels coupled to the rotational output.

54 Claims, 8 Drawing Sheets

U.S. PATENT DOCUMENTS

| | | | |
|---|---|---|---|
| 4,562,894 A | | 1/1986 | Yang |
| 4,719,361 A | | 1/1988 | Brubaker |
| 4,760,275 A | | 7/1988 | Sato et al. |
| 4,774,399 A | * | 9/1988 | Fujita et al. ................. 235/441 |
| 4,774,811 A | * | 10/1988 | Kawamura ................... 60/608 |
| 4,809,177 A | | 2/1989 | Windle et al. |
| 4,953,646 A | * | 9/1990 | Kim ......................... 180/65.4 |
| 4,966,242 A | * | 10/1990 | Baillargeon ................ 180/9.44 |
| 4,985,845 A | | 1/1991 | Götz et al. |
| 5,067,932 A | | 11/1991 | Edwards |
| 5,081,832 A | | 1/1992 | Mowill |
| 5,120,282 A | * | 6/1992 | Fjallstrom ....................... 475/5 |
| 5,168,946 A | | 12/1992 | Dorgan |
| 5,180,456 A | * | 1/1993 | Schultz et al. ............... 152/416 |
| 5,195,600 A | | 3/1993 | Dorgan |
| 5,201,629 A | * | 4/1993 | Simpson et al. ............. 414/632 |
| 5,227,703 A | | 7/1993 | Boothe et al. |
| 5,263,524 A | * | 11/1993 | Boardman .................. 152/416 |
| 5,264,763 A | | 11/1993 | Avitan |
| 5,289,093 A | | 2/1994 | Jobard |
| 5,291,960 A | | 3/1994 | Brandenburg et al. |
| 5,343,971 A | | 9/1994 | Heidelberg et al. |
| 5,345,154 A | | 9/1994 | King |
| 5,369,540 A | | 11/1994 | Konrad et al. |
| 5,389,825 A | | 2/1995 | Ishikawa et al. |
| 5,409,425 A | | 4/1995 | Shibahata |
| 5,418,437 A | | 5/1995 | Couture et al. |
| 5,448,561 A | | 9/1995 | Kaiser et al. |
| 5,504,655 A | | 4/1996 | Underwood et al. |
| 5,508,594 A | | 4/1996 | Underwood et al. |
| 5,508,689 A | | 4/1996 | Rado et al. |
| 5,516,379 A | * | 5/1996 | Schultz ....................... 152/415 |
| 5,538,274 A | | 7/1996 | Schmitz et al. |
| 5,558,588 A | | 9/1996 | Schmidt |
| 5,558,589 A | | 9/1996 | Schmidt |
| 5,558,595 A | | 9/1996 | Schmidt et al. |
| 5,568,023 A | | 10/1996 | Grayer et al. |
| 5,575,730 A | | 11/1996 | Edwards et al. |
| 5,575,737 A | | 11/1996 | Weiss |
| 5,586,613 A | | 12/1996 | Ehsani |
| 5,589,743 A | | 12/1996 | King |
| 5,629,567 A | | 5/1997 | Kumar |
| 5,629,603 A | | 5/1997 | Kinoshita |
| 5,646,510 A | | 7/1997 | Kumar |
| 5,669,470 A | | 9/1997 | Ross |
| 5,672,920 A | | 9/1997 | Donegan et al. |
| 5,679,085 A | | 10/1997 | Fredriksen et al. |
| 5,767,584 A | | 6/1998 | Gore et al. |
| 5,813,487 A | * | 9/1998 | Lee et al. ................... 180/65.1 |
| 5,813,488 A | * | 9/1998 | Weiss ........................ 180/65.6 |
| 5,820,150 A | | 10/1998 | Archer et al. |
| 5,828,554 A | | 10/1998 | Donegan et al. |
| 5,847,520 A | | 12/1998 | Theurillat et al. |
| 5,879,265 A | | 3/1999 | Bek |
| 5,880,570 A | | 3/1999 | Tamaki et al. |
| 5,881,559 A | * | 3/1999 | Kawamura ................... 60/597 |
| 5,924,879 A | | 7/1999 | Kameyama |
| 5,925,993 A | | 7/1999 | Lansberry |
| 5,939,794 A | | 8/1999 | Sakai et al. |
| 5,947,855 A | * | 9/1999 | Weiss ............................. 475/5 |
| 5,957,985 A | | 9/1999 | Wong et al. |
| 5,973,463 A | | 10/1999 | Okuda et al. |
| 5,986,416 A | | 11/1999 | Dubois |
| 5,998,880 A | | 12/1999 | Kumar |
| 6,005,358 A | | 12/1999 | Radev |
| 6,012,004 A | | 1/2000 | Sugano et al. |
| 6,028,403 A | | 2/2000 | Fukatsu |
| 6,038,500 A | | 3/2000 | Weiss |
| 6,054,844 A | | 4/2000 | Frank |
| 6,104,148 A | | 8/2000 | Kumar et al. |
| 6,105,984 A | | 8/2000 | Schmitz et al. |
| 6,201,310 B1 | | 3/2001 | Adachi et al. |
| 6,298,932 B1 | * | 10/2001 | Bowman et al. ............. 180/6.5 |
| 6,387,007 B1 | * | 5/2002 | Fini, Jr. ...................... 475/268 |
| 6,421,593 B1 | | 7/2002 | Kempen et al. |
| 6,434,470 B1 | * | 8/2002 | Nantz et al. ................... 701/93 |
| 6,496,393 B1 | | 12/2002 | Patwardhan |
| 6,501,368 B1 | | 12/2002 | Wiebe et al. |
| 6,553,290 B1 | | 4/2003 | Pillar |
| 6,580,953 B1 | | 6/2003 | Wiebe et al. |
| 6,611,116 B2 | | 8/2003 | Bachman et al. |
| 6,722,458 B2 | * | 4/2004 | Hofbauer ................... 180/65.4 |
| 6,757,597 B2 | | 6/2004 | Yakes et al. |
| 6,882,917 B2 | | 4/2005 | Pillar et al. |
| 6,885,920 B2 | | 4/2005 | Yakes et al. |
| 6,909,944 B2 | | 6/2005 | Pillar et al. |
| 6,922,615 B2 | | 7/2005 | Pillar et al. |
| 6,993,421 B2 | | 1/2006 | Pillar et al. |
| 7,006,902 B2 | | 2/2006 | Archer et al. |
| 7,024,296 B2 | | 4/2006 | Squires et al. |
| 2002/0005304 A1 | | 1/2002 | Bachman et al. |
| 2002/0045507 A1 | | 4/2002 | Bowen |
| 2002/0065594 A1 | | 5/2002 | Squires et al. |
| 2003/0130765 A1 | | 7/2003 | Pillar et al. |
| 2003/0158635 A1 | | 8/2003 | Pillar et al. |
| 2003/0163228 A1 | | 8/2003 | Pillar et al. |
| 2003/0163230 A1 | | 8/2003 | Pillar et al. |
| 2003/0171854 A1 | | 9/2003 | Pillar et al. |
| 2003/0195680 A1 | | 10/2003 | Pillar |
| 2003/0200015 A1 | | 10/2003 | Pillar |
| 2003/0230443 A1 | | 12/2003 | Cramer et al. |
| 2004/0019414 A1 | | 1/2004 | Pillar et al. |
| 2004/0024502 A1 | | 2/2004 | Squires et al. |
| 2004/0039510 A1 | | 2/2004 | Archer et al. |
| 2004/0055802 A1 | | 3/2004 | Pillar et al. |
| 2004/0069865 A1 | | 4/2004 | Rowe et al. |
| 2004/0133319 A1 | | 7/2004 | Pillar et al. |
| 2004/0133332 A1 | | 7/2004 | Yakes et al. |
| 2004/0199302 A1 | | 10/2004 | Pillar et al. |
| 2005/0004733 A1 | | 1/2005 | Pillar et al. |
| 2005/0038934 A1 | | 2/2005 | Gotze et al. |
| 2005/0113988 A1 | | 5/2005 | Nasr et al. |
| 2005/0113996 A1 | | 5/2005 | Pillar et al. |
| 2005/0114007 A1 | | 5/2005 | Pillar et al. |
| 2005/0119806 A1 | | 6/2005 | Nasr et al. |
| 2005/0131600 A1 | | 6/2005 | Quigley et al. |
| 2005/0209747 A1 | | 9/2005 | Yakes et al. |
| 2005/0234622 A1 | | 10/2005 | Pillar et al. |

FOREIGN PATENT DOCUMENTS

| | | |
|---|---|---|
| DE | 41 08 647 A1 | 9/1992 |
| DE | 41 34 160 A1 | 4/1993 |
| DE | 44 31 929 C1 | 10/1995 |
| DE | 197 49 074 A1 | 5/1999 |
| DE | 198 51 436 A1 | 5/2000 |
| EP | 0 564 943 B1 | 10/1993 |
| EP | 0 622 264 B1 | 11/1994 |
| EP | 0 791 506 A2 | 8/1997 |
| EP | 0 805 059 B1 | 11/1997 |
| EP | 0 812 720 A1 | 12/1997 |
| EP | 0 812 720 B1 | 12/1997 |
| EP | 0 898 213 A1 | 2/1999 |
| EP | 0 925 981 A2 | 6/1999 |
| EP | 0 937 600 A2 | 8/1999 |
| EP | 1 018 451 A1 | 7/2000 |
| EP | 1 092 406 A2 | 4/2001 |
| EP | 1 142 744 A1 | 10/2001 |
| EP | 1 229 636 A3 | 8/2002 |
| FR | 2 658 259 A1 | 8/1991 |
| GB | 1 308 318 | 2/1973 |
| GB | 2 302 850 A | 2/1997 |
| JP | 60-216703 A | 10/1985 |
| WO | WO 98/19875 A1 | 5/1998 |

| WO | WO 00/30235 A1 | 5/2000 |
| WO | WO 01/54939 A2 | 8/2001 |
| WO | WO 03/055714 A1 | 7/2003 |
| WO | WO 03/093046 A2 | 11/2003 |
| WO | WO 03/093046 A3 | 11/2003 |

OTHER PUBLICATIONS

European Search Report based European Application No. EP 0 72 4300, date of completion of the search Jul. 4, 2005 (1 page).

Dana Corporation, Kallamazoo, Michigan, "Dana® Spicer® Central Tire Inflation System Specifications," www.dana.com.

Bose, B.K. et al., *"High Frequency AC vs. DC Distribution System for Next Generation Hybrid Electric Vehicle,"* Industrial Electronics, Control and Instrumentation, 1996, Proceedings of the 1996 IEEE IECON 22nd International Conference on Taipei, Taiwan, Aug. 5-10, 1996, New York, NY, pp. 706-712 (7 pgs.).

Khan, I.A., "Automotive Electrical Systems: Architecture and Components," Digital Avionics Systems Conference, 1999, IEEE pp. 8.C.5-1-8.C.5-10 (10 pgs.).

Namuduri, C.S. et al., "High Power Density Electric Drive for an Hybrid Vehicle," Applied Power Electronics Conference and Exposition, Feb. 15, 1998, pp. 34-40 (7 pgs.).

Rajashekara, K., "History of Electric Vehicles in General Motors," Industry Applications Society Annual Meeting, Oct. 2-8, 1993, pp. 447-454 (8 pgs.).

\* cited by examiner

HYBRID VEHICLE WITH COMBUSTION ENGINE/ELECTRIC MOTOR DRIVE

FIELD OF THE INVENTION

The present invention relate to a drive system for a vehicle. In particular, the present invention relates to a work vehicle driven alternatively and in combination by a primary motor and at least one electric motor.

BACKGROUND OF THE INVENTION

Typical vehicles whether automobiles, fire trucks, garbage trucks, cement mixers, multiwheel drive trucks, military transport trucks, etc. include a combustion engine mechanically coupled to the driven wheels. This coupling typically takes the form of a clutch or torque converter coupled to a multispeed transmission which is coupled to the driven wheels. More specifically, the driven wheels are usually driven in pairs through a differential coupled to the transmission by an appropriate drive train e.g. drive shaft, angle drive, etc.

While this type of drive train is highly reliable, efficient based upon mature technology, it is relatively expensive in comparison to the other components of the vehicle. Additionally, cost effective transmissions typically require engine oversizing to provide suitable vehicle speed surges. Thus, to save transmission cost, there is an increase in engine cost and vise versa. The ultimate selection is ultimately determined by performance and cost requirements.

In attempts to reduce the complexity and cost of drive trains electric and hydrostatic drives have been considered. However, these types of drives have proven to be too inefficient to be practical. Accordingly, it would be desirable to provide a hybrid drive which combines the cost savings and flexibility of an electric motor drive with the efficiency of a combustion engine based drive.

SUMMARY OF THE INVENTION

One embodiment of the invention relates to a work vehicle. The work vehicle includes an engine, a generator coupled to the engine so as to be driven by the engine, a drive shaft coupled to the engine so as to be driven by the engine, a drive axle coupled to the drive shaft so as to be driven by the drive shaft, first and second wheel ends coupled to the drive axle so as to be able to be driven by the drive axle, first and second wheels coupled to the associated first and second wheel ends, and a wheel end drive assembly coupled to at least one wheel end so as to be able to drive the at least one wheel end. The wheel end drive assembly includes an electric motor powered by the generator and a planetary gearset. The planetary gearset includes a first input coupled to the drive axle, a second input coupled to the electric motor, and an output shaft. The wheel end drive assembly further includes a planetary reduction gear having an input coupled to the output shaft of the planetary gearset and an output coupled to the wheel end. The vehicle further includes a central tire inflation system including an air supply source, an air manifold, an inflatable tire coupled to the air manifold and disposed on the wheel, and a central tire inflation system control unit. The central tire inflation system control unit is configured to generate a central tire inflation system control signal, wherein the air manifold regulates the air supplied to the wheel in response to the control signal.

Another exemplary embodiment of the preferred invention relates to a work vehicle including an engine, a first generator coupled to the engine so as to be driven by the engine, a drive shaft coupled to the engine so as to be driven by the engine, a drive axle coupled to the drive shaft so as to be driven by the drive shaft, first and second wheel ends coupled to the drive axle so as to be able to be driven by the drive axle, first and second wheels coupled to the associated first and second wheel ends, and a wheel end drive assembly coupled to at least one wheel end so as to be able to drive the at least one wheel end. The wheel end drive assembly includes an electric motor powered by the first generator, a planetary gearset having a first input coupled to the drive axle, a second input coupled to the electric motor, and an output shaft. The vehicle further includes a secondary generator coupled to the engine so as to be driven by the engine.

Another exemplary embodiment relates to a work vehicle including an engine, a generator coupled to the engine so as to be driven by the engine, a drive shaft coupled to the engine so as to be driven by the engine, a drive axle coupled to the drive shaft so as to be driven by the drive shaft, first and second wheel ends coupled to the drive axle so as to be able to be driven by the drive axle, first and second wheels coupled to the associated first and second wheel ends, a wheel end drive assembly coupled to at least one wheel end so as to be able to drive the at least one wheel end, the wheel end drive assembly including, an electric motor powered by the generator, a planetary gearset, the planetary gearset having a first input coupled to the drive axle, a second input coupled to the electric motor, and an output shaft; and an ancillary equipment coupled to the drive shaft so as to be powered by the drive shaft.

Another exemplary embodiment relates to a work vehicle. The work vehicle includes an engine, a generator coupled to the engine so as to be driven by the engine, a secondary motor/generator coupled to the engine so as to be driven by the engine, a drive shaft coupled to the engine so as to be driven by the engine, a drive axle coupled to the drive shaft so as to be driven by the drive shaft, first and second wheel ends coupled to the drive axle so as to be able to be driven by the drive axle, first and second wheels coupled to the associated first and second wheel ends, a wheel end drive assembly coupled to at least one wheel end so as to be able to drive the associated wheel. The wheel end drive assembly includes an electric motor powered by the generator and a planetary gearset, the planetary gearset having a first input coupled to the drive axle, a second input coupled to the electric motor, and an output shaft coupled to the wheel end. The electric motor and planetary gearset are disposed within the wheel end.

Another exemplary embodiment relates to a work vehicle comprising an engine, a secondary motor/generator coupled to the engine so as to be driven by the engine, a generator coupled to the engine so as to be driven by the engine, a drive shaft coupled to the engine so as to be driven by the engine, a drive axle coupled to the drive shaft so as to be driven by the drive shaft, first and second wheel ends coupled to the drive axle so as to be able to be driven by the drive axle, first and second wheels coupled to the associated first and second wheel ends, a wheel end drive assembly coupled to at least one wheel end so as to be able to drive the associated wheel. The wheel end drive assembly includes an electric motor disposed external to the wheel end powered by the generator and a planetary gearset disposed within the wheel end, the planetary gearset having a first input coupled to the drive axle, a second input coupled to the electric motor and an output shaft coupled to the wheel end.

Another exemplary embodiment relates to a work vehicle. The work vehicle includes an engine, a secondary motor/generator coupled to the engine so as to be driven by the engine, a generator coupled to the engine so as to be driven by the engine, a drive shaft coupled to the engine so as to be driven by the engine, a drive axle coupled to the drive shaft so as to be driven by the drive shaft, first and second wheel ends coupled to the drive axle so as to be able to be driven by the drive axle, first and second wheels coupled to the associated first and second wheel ends, a wheel end drive assembly coupled to at least one wheel end so as to be able to drive the associated wheel. The wheel end drive assembly includes an electric motor disposed external to the wheel end and powered by the generator and a planetary gearset disposed external to the wheel end. The planetary gearset can include a first input coupled to the drive shaft, a second input coupled to the electric motor, and an output shaft coupled to the wheel end.

Another exemplary embodiment relates to a work vehicle. The work vehicle includes an engine, a secondary motor/generator coupled to the engine so as to be driven by the engine, a generator coupled to the engine so as to be driven by the engine, a drive shaft coupled to the engine so as to be driven by the engine, a drive axle coupled to the drive shaft so as to be driven by the drive shaft, first and second wheel ends coupled to the drive axle so as to be able to be driven by the drive axle, first and second wheels coupled to the associated first and second wheel ends, a wheel end drive assembly coupled to at least one wheel end so as to be able to drive the associated wheel. The wheel end drive assembly includes an electric motor disposed external to the wheel end powered by the generator and a planetary gearset disposed external to the wheel end. The planetary gearset can include a first input coupled to the drive shaft, a second input coupled to the electric motor and an output shaft coupled to the drive axle.

Another exemplary embodiment relates to a vehicle. The vehicle includes a prime mover, a generator mechanically coupled to the prime mover, a first multi-input drive unit having at least first and second rotational inputs and at least one rotational output, wherein the first rotational input is coupled to the prime mover, a first electric motor mechanically coupled to the second rotational input and electrically coupled to the generator and a first pair of vehicle drive wheels coupled to the rotational output.

Another exemplary embodiment relates to a vehicle. The vehicle including a prime mover, a generator mechanically coupled to the prime mover, a first multi-input drive unit having at least first and second rotational inputs and at least one rotational output, wherein the first rotational input is coupled to the prime mover, a first electric motor mechanically coupled to the second rotational input and electrically coupled to the generator, a second multi-input drive unit having at least first and second rotational inputs and at least one rotational output, wherein the first rotational input of the second multi-input drive unit is coupled to the rotational output of the first multi-input drive unit, a second electric motor mechanically coupled to the second rotational input of the second multi-input drive unit and electrically coupled to the generator, a first vehicle drive wheel coupled to the rotational output of the second multi-input drive unit, a third multi-input drive unit having at least first and second rotational inputs and at least one rotational output, wherein the first rotational input of the third multi-input drive unit is coupled to the rotational output of the first multi-input drive unit, a third electric motor mechanically coupled to the second rotational input of the third multi-input drive unit and electrically coupled to the generator and a second vehicle drive wheel coupled to the rotational output of the third multi-input drive unit.

DETAILED DESCRIPTION OF THE PREFERRED EMBODIMENTS

Figure 1:
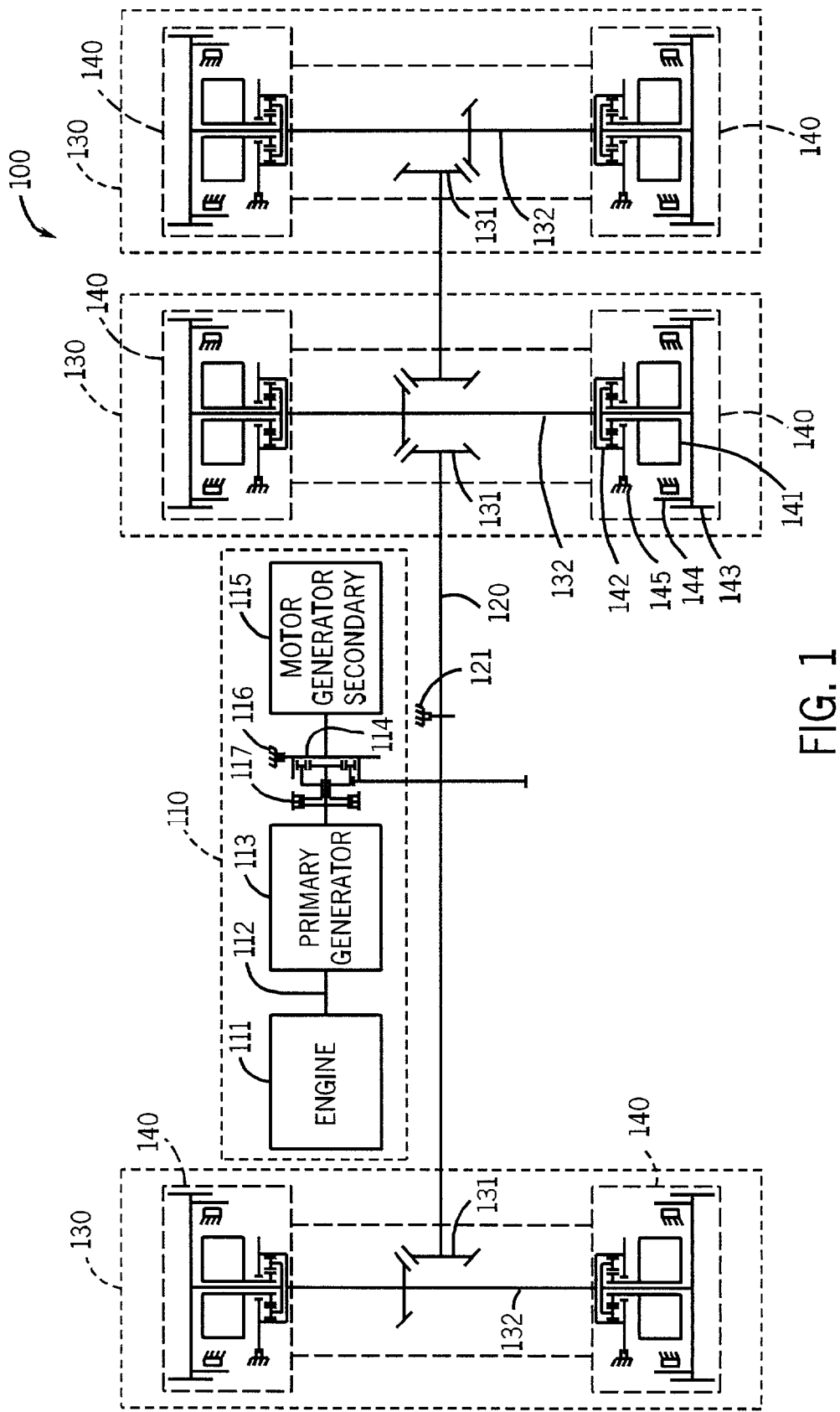
FIG. 1 is a schematic view of the driveline for a multi-axle vehicle.

FIG. 1 is a top-down view of the driveline for a multi-axle vehicle 100. The driveline can includes a power assembly 110, a drive shaft 120, and at least one hybrid drive axle assembly 130.

According to an exemplary embodiment, power assembly 110 can include an prime mover 111, a prime mover output shaft 112, a primary generator 113, a power divider planetary gear 114, a secondary generator 115, a secondary generator brake 116, and a prime mover clutch 117. Prime mover 111 can be any source of rotational mechanical energy which is derived from a stored energy source such as a liquid or gaseous fuel. Examples are an internal combustion gas powered engine, a diesel engine, turbines, fuel cell driven motors, an electric motor, or any other type of motor capable of providing rotational mechanical energy to prime mover output shaft 112.

Prime mover output shaft 112 can be coupled to primary generator 113 so as to provide power to primary generator 113. Primary generator 113 can be any device that can convert mechanical rotational energy to electrical energy. A generator that can function as an electric motor is not excluded from the meaning of generator.

Prime mover output shaft 112 can be further coupled to power divider planetary gear 114 so as to provide a rotational mechanical energy input to power divider planetary gear 114. Power divider planetary gear 114 can be coupled to secondary generator 115 and drive shaft 120 so as to provide rotational mechanical energy to power divider planetary gear 114 and drive shaft 120.

Drive shaft 120 can be any drive shaft capable of receiving rotational mechanical energy and transferring the rotational mechanical energy to at least one hybrid drive axle assembly 130. Drive shaft 120 includes a drive shaft clutch 121. Drive shaft clutch 121 can be any type of clutch capable of rotationally fixing drive shaft 120. Drive shaft 120 is shown in FIG. 1 as being coupled to three hybrid drive axle assemblies 130. According to alternative embodiments, vehicle 100 can include greater or fewer hybrid drive axle assemblies 130.

According to an exemplary embodiment, hybrid drive axle assembly 130 can be every axle of a vehicle. Accordingly, wherein a vehicle includes three axles as shown in FIG. 1, a vehicle can include three of hybrid drive axle assembly 130. According to alternative embodiments, hybrid drive axle assembly 130 can be fewer than all of the axles on a vehicle. Alternative embodiments for hybrid drive axle assembly 130 are described with reference to FIGS. 3 through 6.

Hybrid drive axle assembly 130 can include a bevel gear set 131, a drive axle 132, and two wheel end assemblies 140. Bevel gear set 131 is housed inside hybrid drive axle assembly 130. Bevel gear set 131 receives as input the rotational mechanical energy applied to drive shaft 120. Bevel gear set 131 can provides rotational mechanical energy as an output to wheel end assemblies 140. Wherein hybrid drive axle assembly 130 is not a terminal axle on the driveline, bevel gear set 131 can further provide rotational mechanical energy as an output to a continuation of drive shaft 120.

Wheel end assembly 140 can include an electric motor 141, a multi-input drive unit 142, a wheel 143, a wheel brake 144, and a multi-input drive unit brake 145. Wheel end assembly 140 receives as inputs rotational mechanical energy from drive axle 132 and electric energy from primary generator 113.

Electric motor 141 receives electric energy from primary generator 113 and provides rotational mechanical energy as an output to multi-input drive unit 142. Electric motor 141 can be any device which can convert electric energy to rotational mechanical energy. An electric motor which can function as a generator is not excluded from the definition of electric motor.

Multi-input drive unit 142 receives as input the rotational mechanical energy from electric motor 141 and the rotational mechanical energy from drive axle 132. Multi-input drive unit 142 provides rotational mechanical energy as an output to wheel 143. Multi-input drive unit 142 output can be reduced or halted using multi-input drive unit brake 145.

Multi-input drive unit 142 as described in this application an any patents issuing herefrom broadly means an arrangement which combines two or more rotational inputs to provide at least one rotational output. One example of a multi-input drive unit is a differential gear train which can be used to combine two rotational inputs to provide a rotational output where the speed, torque and or power of the inputs are mechanically summed to produce an output. Another example of a multi-input drive unit is a planetary gear set which combines two rotational inputs to generate a rotational output. These two examples are examples only, and the term multi-input drive unit should be interpreted as broadly as permitted by the prior art and applicable law. It is not the inventors intent to limit the term multi-input drive unit to differential or planetary drive arrangements because it is not the inventors intent to limit the scope of protection for the invention claimed herein to particular mechanical arrangements unless specifically claimed or required by the prior art. For example, a multi-input drive unit could also include an elliptical drive, a non-gear based drive or a combination of drives arranged to permit the combination (sum, difference, multiplication or division of the speed, torque or power) of at least two rotational inputs to generate a rotational output.

According to an exemplary embodiment, wheel brake 144 can be any standard brake capable of inhibiting movement of vehicle 100. According to an alternative embodiment, wheel brake 144 can be a component in a regenerative braking system. In a regenerative braking system, the rotational mechanical energy can be removed from the rotating wheel and converted into electrical energy. This electrical energy can be stored for later use in vehicle power systems or electrical motors 141. Advantageously, a regenerative braking system allows for greater efficiencies by conserving energy.

According to an exemplary embodiment, wheel end 140 can further include a central tire inflation system. A central tire inflation system can be used to increase or decrease tire pressure based on operator input, sensor feedback, or a combination thereof. A variety of central tire inflation systems are known to those of skill in the art. One example of a central tire inflation system is the Dana® Spicer® Central Tire Inflation System commercially available from Eaton Corporation of Cleveland, Ohio.

Advantageously, a control circuit for a central tire inflation system can be coupled to a control circuit for a hybrid drive, described with reference to FIG. 7, to provide an optimal configuration based on driving and environmental conditions. For example, at high speeds, in addition to utilizing a pure mechanical drive, it may be advantageous to increase tire pressure to maximize efficiencies. In contrast, while driving through difficult terrain, it may be advantageous to lower tire pressure to promote traction while creeping with an electric drive.

According to an exemplary embodiment, the operation of electric motor(s) 141 and prime mover 111 can be controlled by a control circuit. An exemplary control circuit is described with reference to FIG. 7. The control circuit can control the operation of a driveline component based on a combination of the sensor inputs and operator commands. Sensor inputs can include sensing the current speed of the vehicle, whether the vehicle is turning, any slippage occurring at the wheels, and any other input that could effect the amount of rotational mechanical energy that should be applied to the wheels, either individually or collectively. Operator inputs can include pressing the accelerator, turning the wheel, indicating a slip situation, or any other input that could affect the amount of rotational mechanical energy that should be applied to the wheels, either individually or collectively.

According to an exemplary embodiment, the present system can be utilized in at least three independent states. The states can include an electric state, an electric/mechanical state, and a mechanical state. The states can be utilized based on the speed and power requirements of the vehicle.

In an electric state, electric motor(s) 141 provide the sole mechanical rotational energy for low speed and high torque modes of operation. According to an exemplary embodiment, the electric state can be utilized at speeds up to 20 miles per hour.

In the electric state, prime mover 111 can operate at a fixed speed and primary generator 113 can operate at full power output. Electric energy generated by primary generator 113 can be supplied to electric motors 141 for conversion to rotational mechanical energy. In an electric state, drive shaft clutch 121 can be engaged to rotationally fix drive shaft 120.

Advantageously, the electric state allows electric motor(s) 141 to provide the low speed and high torque output to the wheels necessary for low speed operation while prime mover 111 can be operated at an optimal fixed speed. Operating prime mover 111 at an optimal speed allows for optimal power output and fuel efficiencies.

The driveline of vehicle 100 in the electric state can present issues with inertia. One possible solution to this problem is the inclusion of secondary generator 115. During series operation, secondary generator 115 can be spinning in the opposite direction of the engine to reduce the system inertia. Further, the internal gears can be held by multi-input drive unit brake 145 to react against the torque provided by the electric motors.

The electric/mechanical state can be utilized at speeds approximately between 20 miles per hour and 40 miles per hour. In the electric/mechanical state, prime mover 111 can still be operated at a constant speed to take advantage of power and fuel efficiencies. However, secondary generator 115 is decelerated to zero speed and is held by secondary generator brake 116. Braking secondary generator 115 results in rotational mechanical energy from prime mover 111 being transmitted through drive shaft 120 to multi-input drive units 142. Electric motor(s) 141 also supply rotational mechanical energy to multi-input drive units 142. Multi-input drive units 142 combine the rotational mechanical energy from prime mover 111 and electric motor(s) 141 and apply the energy to wheel(s) 143.

The mechanical state occurs at speeds greater than approximately 40 miles per hour. In the mechanical state, secondary generator 115 can be operated as a motor and driven up to engine speed. Upon reaching a uniform speed, power divider planetary gear 114 is locked using prime mover clutch 117 such that a second higher rotational mechanical energy is applied to drive shaft 120.

According to an exemplary embodiment, the present driveline can present further advantages when the vehicle is turning. Vehicle 100, as shown in FIG. 1, does not include a differential gear along drive axle 132. This means that during turning, the rotational mechanical energy supplied to each wheel by drive axle 132 will be uniform. However, because the wheels will necessarily rotate at different speeds during a turn, this can cause stresses to vehicle 100. Electric motor(s) 141 can be used to counteract this effect. The electric motor 141 coupled to the wheel on the outside of the turning radius can supply additional rotational mechanical energy to bring the wheel up to the necessary speed to complete the turn without causing stress to the vehicle.

Advantageously, wherein differential rotational mechanical energy is supplied by electric motor(s) 141 during a turn, there is no requirement for a differential gear. The differential gear can be a relatively expensive piece of equipment. This expense can be avoided using the described method.

Figure 2:
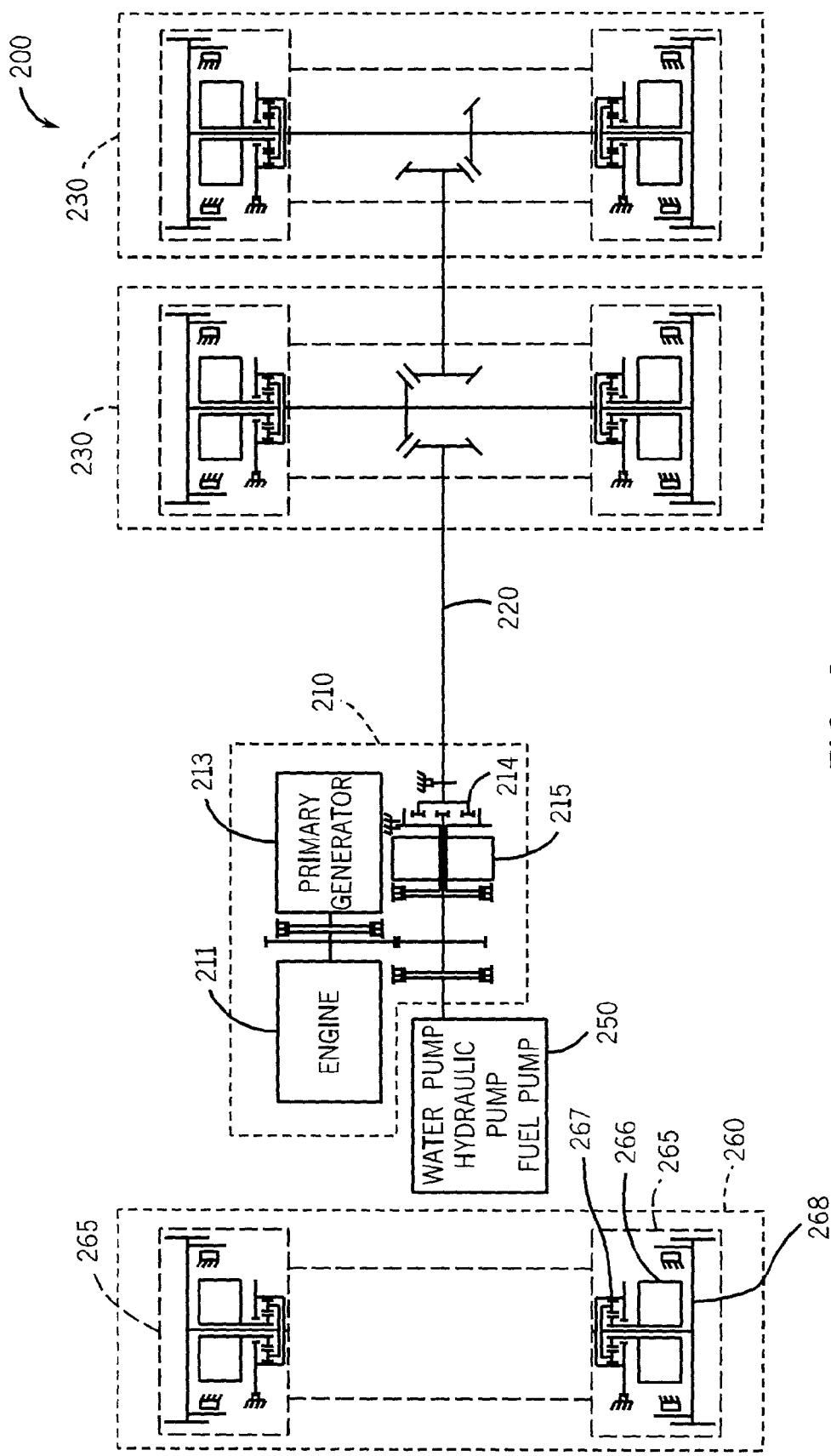
FIG. 2 is a schematic view of an alternative driveline for a multi-axle vehicle including a power take off assembly.

FIG. 2 is a schematic view of an alternative embodiment of a driveline for a vehicle 200. Similar to vehicle 100, the driveline includes an power assembly 210, a drive shaft 220 and at least one hybrid drive axle assembly 230. The driveline of vehicle 200 further includes a power take off assembly 250. According to an exemplary embodiment, vehicle 200 can further include an electric motor driven axle assembly 260.

Power assembly 210 includes a prime mover 211, a primary generator 213, a power divider planetary gear 214, and a second generator 215. These components are similar to the similarly described and numbered components described with reference to FIG. 1. The components are shown in a different configuration but provide the same function as describe with reference to FIG. 1.

Drive shaft 220 of vehicle 200 is similar to drive shaft 120 described with reference to FIG. 1. In addition to the features described with reference to drive shaft 120, drive shaft 220 can be coupled to power take off assembly 250.

Power take off assembly 250 can be any system that is coupled to drive shaft 220 to receive rotational mechanical energy therefrom. The rotational mechanical energy can be utilized by power take off assembly 250 to provide power to an auxiliary system associated with vehicle 200.

Advantageously, because prime mover 211 is run at a constant, optimal speed, power take off assembly 250 can be supplied with constant rotational mechanical energy independent of the speed of vehicle 200.

According to an exemplary embodiment, power take off assembly 250 can be a hydraulic pump driven system. The hydraulic pump can be coupled to a lifting mechanism to lift heavy loads for transport using vehicle 200. Advantageously, full prime mover power can be supplied to power the lifting mechanism while the vehicle is slowly moved backward or forward by hybrid drive axle assembly 230. An example, described with reference to FIG. 8 can be a HEMMIT truck including a palletized load system manufactured by OshKosh Trucks of OshKosh, Wis.

According to an alternative embodiment, power take off assembly 250 can be a high volume water pump. Advantageously, full prime mover power can be supplied to power the high volume water pump while the vehicle is slowly moved backward or forward by hybrid drive axle assembly 230. An example can be a fire truck including the high volume pump. Advantageously, the fire truck can pump a high volume of water while creeping slowly forward or in reverse to accurately direct water flow at a fire. This feature would be particularly useful in airport crash vehicles.

According to another alternative embodiment, power take off assembly 250 can be a power generator where the rotational mechanical energy is converted into electric energy to power additional auxiliary systems. Advantageously, the full rotational mechanical energy of prime mover 211 can be applied to the power generator while the vehicle is stopped.

Several alternative embodiments have been described with reference to power take off assembly 250, however the invention is not limited to the described embodiments. Any power take off system that utilizes the rotational mechanical energy supplied by prime mover 211 is within the scope and spirit of the invention.

Electric motor driven axle assembly 260 can include wheel ends 265. Electric motor driven axle assembly 260 is similar to the hybrid drive axle assembly 130, described with reference to FIG. 1. The difference is that electric motor driven axle assembly 260 is not driven in part by drive shaft 220.

Wheel end assemblies 265 can include an electric motor 266, a reduction gear 267 and a wheel 268. Electric motor 266 can supply rotational mechanical energy to reduction gear 267. Reduction gear 267 can convert the rotational mechanical energy to an appropriate level for output to wheel 268.

Advantageously, electric motor driven axle assembly 260 can provide differential functionality, described with reference to FIG. 3, without requiring that the axle be driven by drive axle 220.

Figure 3:
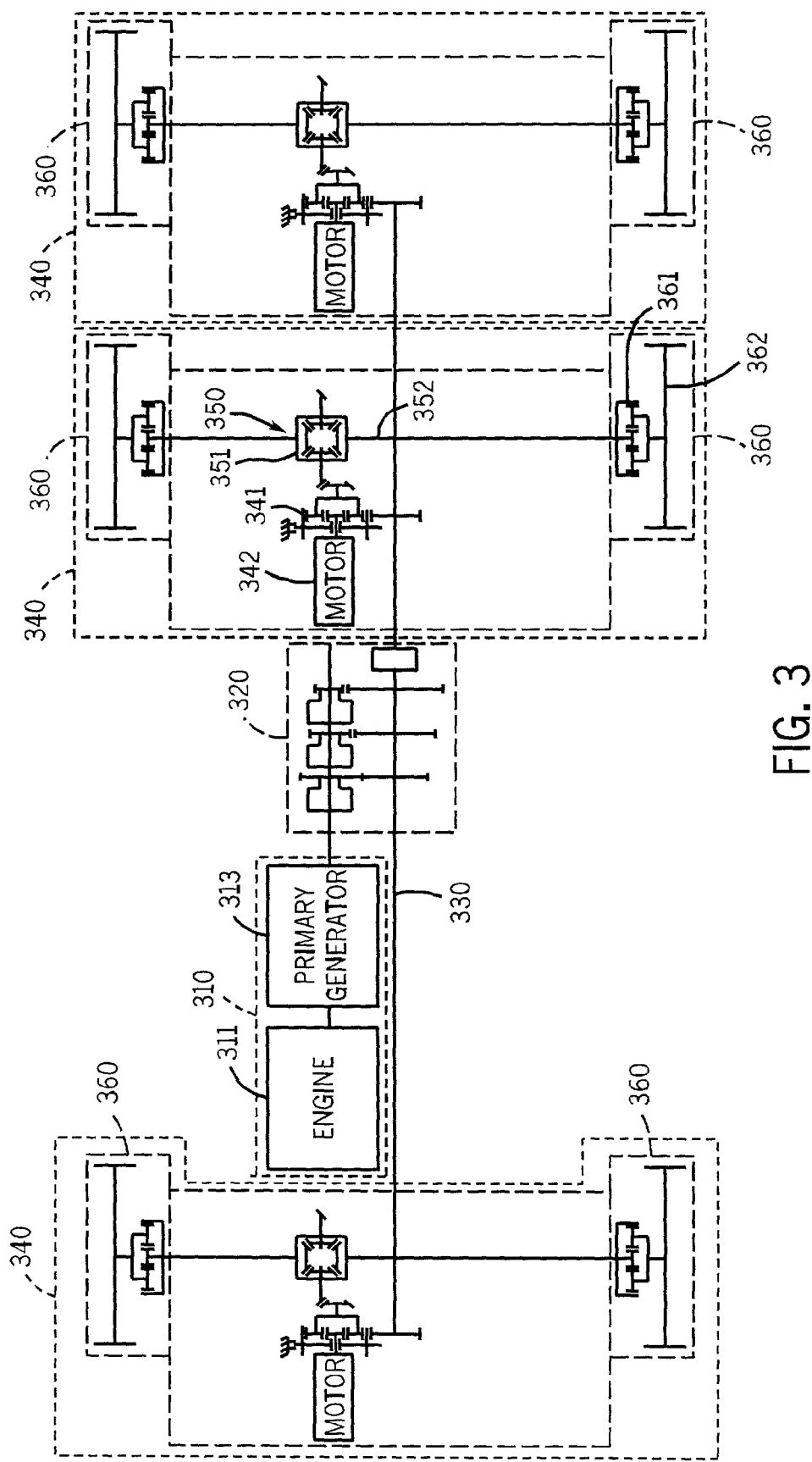
FIG. 3 is a schematic view of an alternative driveline for a multi-axle vehicle including a transmission.

FIG. 3 is a schematic view of an alternative embodiment for a drive line for a multi-axle vehicle 300. The drive line include a power assembly 310, a transmission 320, a drive shaft 330 and at least one hybrid drive axle assembly 340.

Power assembly include a prime mover 311 coupled to a primary generator 313 so as to provide power to primary generator 313. Prime mover 311 and primary generator 313 are similar to prime mover 111 and primary generator 113 described with reference to FIG. 1.

Transmission 320 is a three speed transmission. Transmission 320 receives as input the mechanical rotational energy from prime mover 311. Transmission 320 can provide variable transmission of the mechanical rotational energy based on the transmission gear that is currently engaged. According to an exemplary embodiment, transmission 320 can be a simple transmission not including torque conversion or reverse functionality. Transmission 320 can be sized for input equal to peak engine torque. The transmission outputs rotational mechanical energy to drive shaft 330.

Transmission 320 is shown as including three transmission gears for illustrative purposes only, any size transmission could be substituted. Advantageously, transmission 320 can replace an existing transfer case to reduce overall system weight. Further, the input torque requirements for transmission 320 would be approximately six time less than for an existing transfer case.

Drive shaft 330 is similar to drive shaft 120 as described with reference to FIG. 1. Drive shaft 330 receives as input rotational mechanical energy from transmission 320. The drive shaft provides as output rotational mechanical energy to at least one multi-input drive unit 341.

Hybrid drive axle assembly 340 includes a multi-input drive unit 341, an electric motor 342 and a drive axle assembly 350. Hybrid drive axle assembly 340 is an alternative embodiment of hybrid drive axle assembly 130. Vehicle 300 can include at least one hybrid drive axle assembly 340. Vehicle 300 can further include a combination of hybrid drive axle assemblies 340 and normal axles.

Multi-input drive unit 341 functions similarly to multi-input drive unit 142 described with reference to FIG. 1, however multi-input drive unit 341 receives different inputs. Multi-input drive unit 341 receives as an input rotational mechanical energy from electric motor 342 and the rotational mechanical energy from drive shaft 330. Multi-input drive unit 341 provides rotational mechanical energy as an output to drive axle assembly 350.

Drive axle assembly 350 includes a differential gear 351 and a drive axle 352. Differential gear 351 receives as input the rotational mechanical energy from multi-input drive unit 341 and transfers the energy to drive axle 352.

Drive axle 352 is an differential axle capable of receiving the mechanical rotational energy from differential gear 351 and transferring the non uniform mechanical rotational energy to each wheel end assembly 360.

Wheel end assemblies 360 include a reduction gear 361 coupled to a wheel 362. The reduction gear receives the mechanical rotational energy from drive axle 352 and reduces that energy to an appropriate level. The reduced mechanical rotational energy is applied to wheel 362 to move the vehicle.

Figure 4:
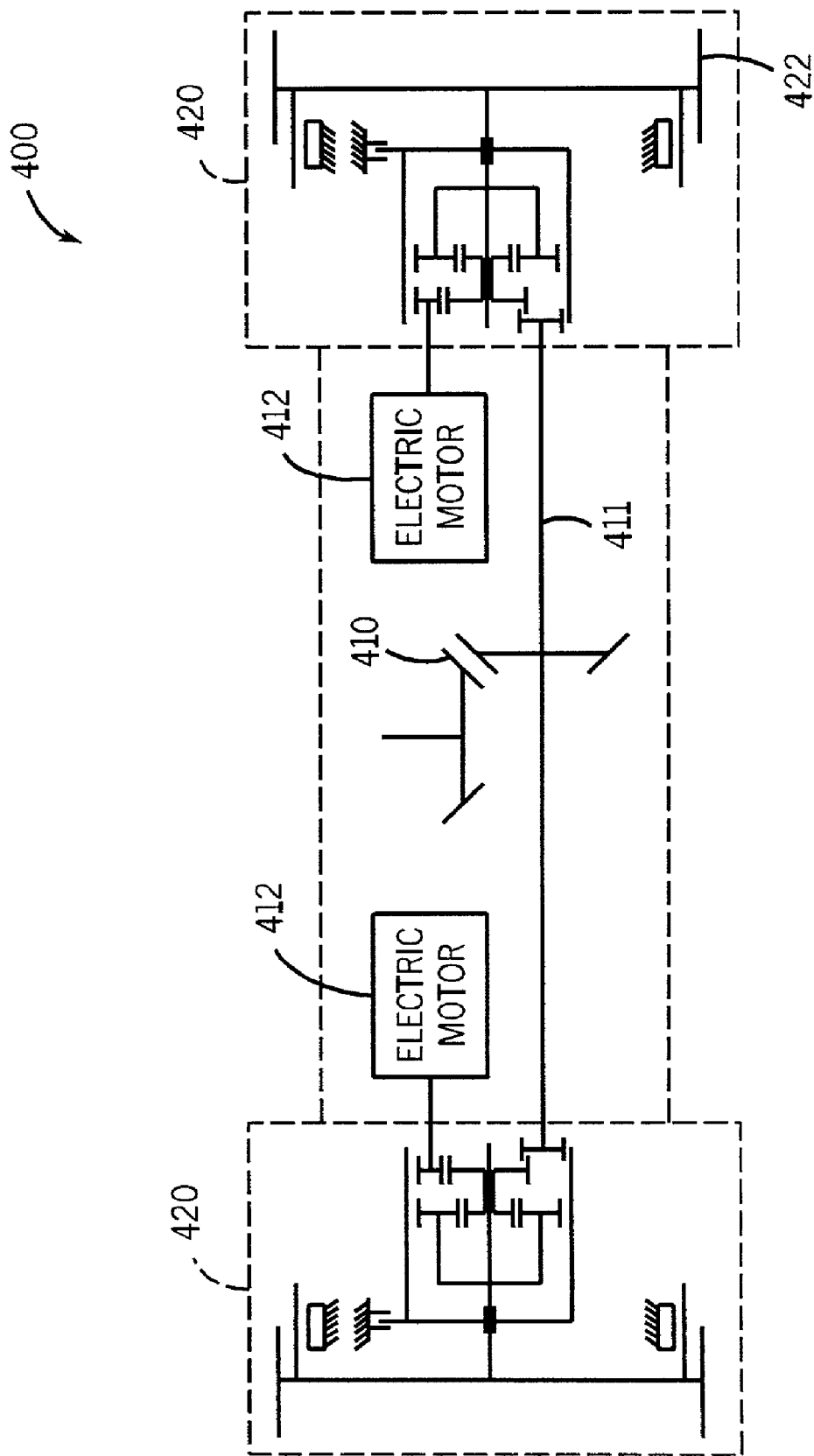
FIG. 4 is a schematic view of an alternative embodiment of a hybrid drive axle assembly.

FIG. 4 is a schematic view of an alternative embodiment of a hybrid drive axle assembly 400. Hybrid drive axle assembly 400 include an bevel gear set 410, a drive axle 411, two electric motors 412 and two wheel end assemblies 420.

Bevel gear set 410 receives as input the rotational mechanical energy from drive shaft 120. Bevel gear set 410 transfers the rotational mechanical energy to drive axle 411. Drive axle 411 transfers the rotational mechanical energy to wheel end assemblies 420.

Electric motors 412 can be electrically coupled to primary generator 113 so as to be powered by primary generator 113. The electric motors convert the electric energy into rotational mechanical energy. The rotational mechanical energy is provided as an output to an associated wheel end assembly 420.

Wheel end assemblies 420 include a multi-input drive unit 421 and a wheel 422. Multi input drive unit 421 is similar to multi-input drive unit 142.

Figure 5:
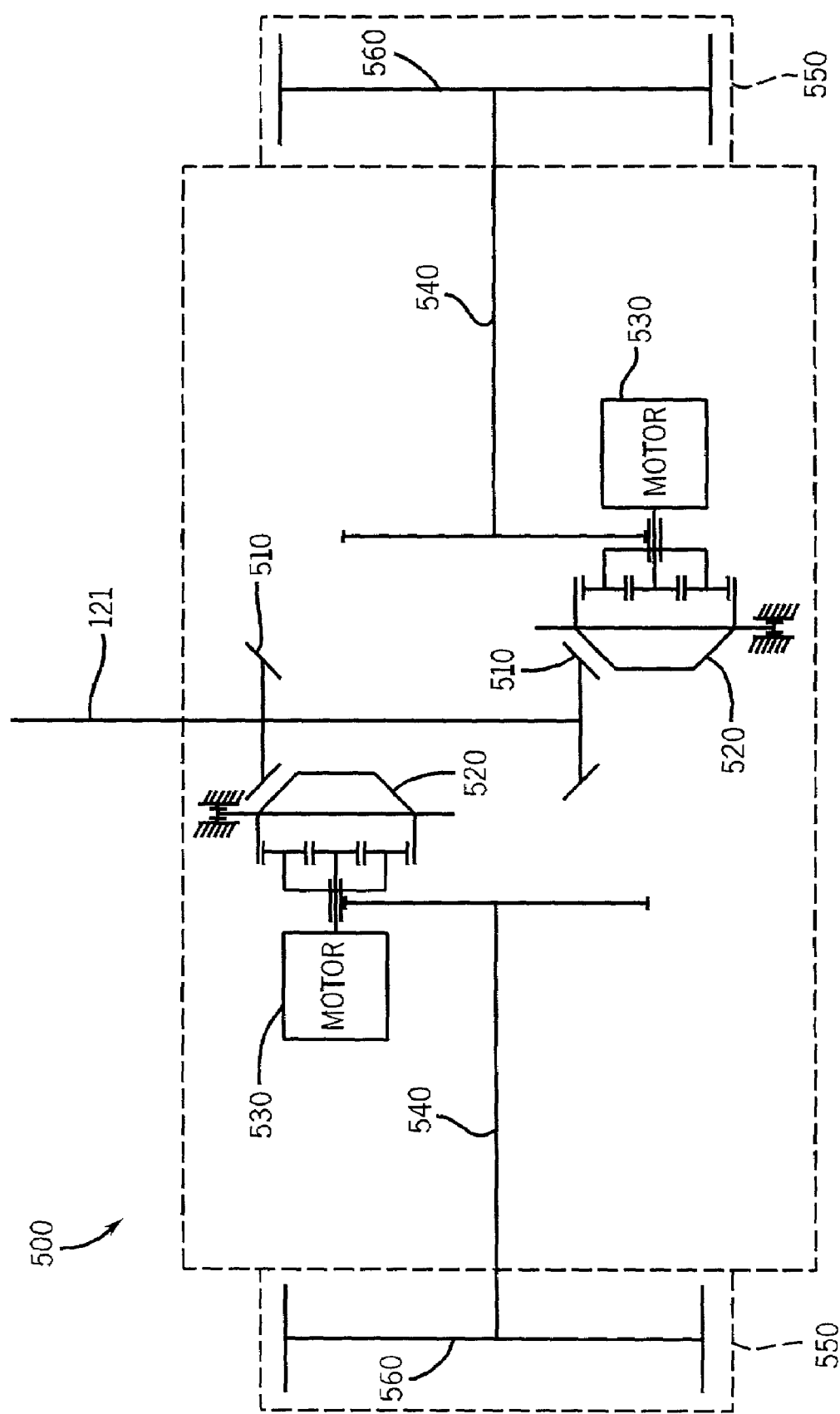
FIG. 5 is a schematic view of an alternative embodiment of a hybrid drive assembly.

FIG. 5 is a schematic view of another alternative embodiment of a hybrid drive axle assembly 500. Hybrid drive axle assembly 500 is similar in function and advantage to hybrid drive axle assembly 130.

Hybrid drive axle assembly 500 includes two bevel gear sets 510, two multi-input drive units 520, two electric motors 530, two drive axle 540, and two wheel ends 550.

Bevel gear sets 510 are rotationally fixed to drive shaft 120 so as to transfer rotational mechanical energy from drive shaft 120 to multi-input drive units 520. Multi-input drive units 520 additional receive rotational mechanical energy as an input from electric motors 530.

Multi-input drive units 520 function similarly to multi-input drive units 142, described with reference to FIG. 1. Multi-input drive units 520 combine the inputs from drive shaft 121 and electric motors 530 to produce a single mechanical rotational energy as an output. The rotational mechanical energy is applied to drive axles 540.

Drive axles 540 receive as input the rotational mechanical energy from the multi-input drive units 520. The rotational mechanical energy is transferred to the wheel ends 550. The wheel ends 550 contain a wheel 560 that rotates in response to the rotational mechanical energy, moving the vehicle.

Figure 6:
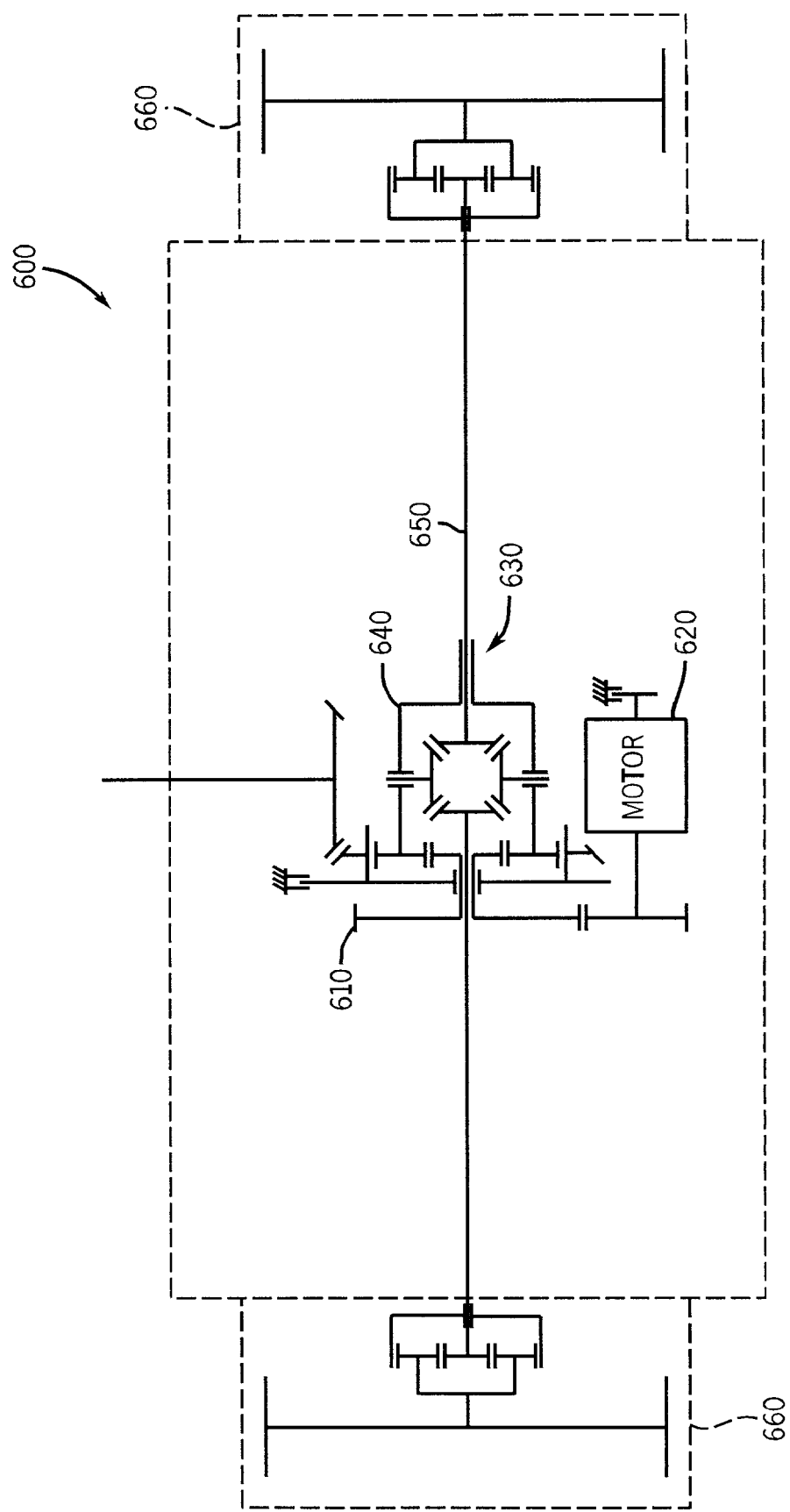
FIG. 6 is a schematic view of an alternative embodiment of a hybrid drive assembly.

FIG. 6 is a schematic view of an alternative embodiment of a hybrid drive assembly 600. Hybrid drive axle assembly 600 includes a multi-input drive unit 610, a single electric motor 620, a drive axle assembly 630 and two wheel end assemblies 660. Hybrid drive axle assembly is an alternative embodiment of hybrid drive axle assembly 130.

Multi-input drive unit 610 functions similarly to multi-input drive unit 341 described with reference to FIG. 3. Multi-input drive unit 610 receives as input the rotational mechanical energy from electric motor 620 and the rotational mechanical energy from drive shaft 120. Multi-input drive unit 610 provides rotational mechanical energy as an output to drive axle assembly 630.

Drive axle assembly 630 includes a differential gear 640 and a drive axle 650. Differential gear 640 receives as input the rotational mechanical energy from multi-input drive unit 610 and transfers the energy to drive axle 650. Drive axle 650 is an differential axle capable of receiving the mechanical rotational energy from differential 640 and transferring the energy to wheel end assemblies 660. Wheel end assemblies 660 include a reduction gear 661 coupled to a wheel 662. The reduction gear receives the mechanical rotational energy from drive axle 650 and reduces that energy to appropriate level. The reduced mechanical rotational energy is applied to wheel 662 to move the vehicle.

Figure 7:
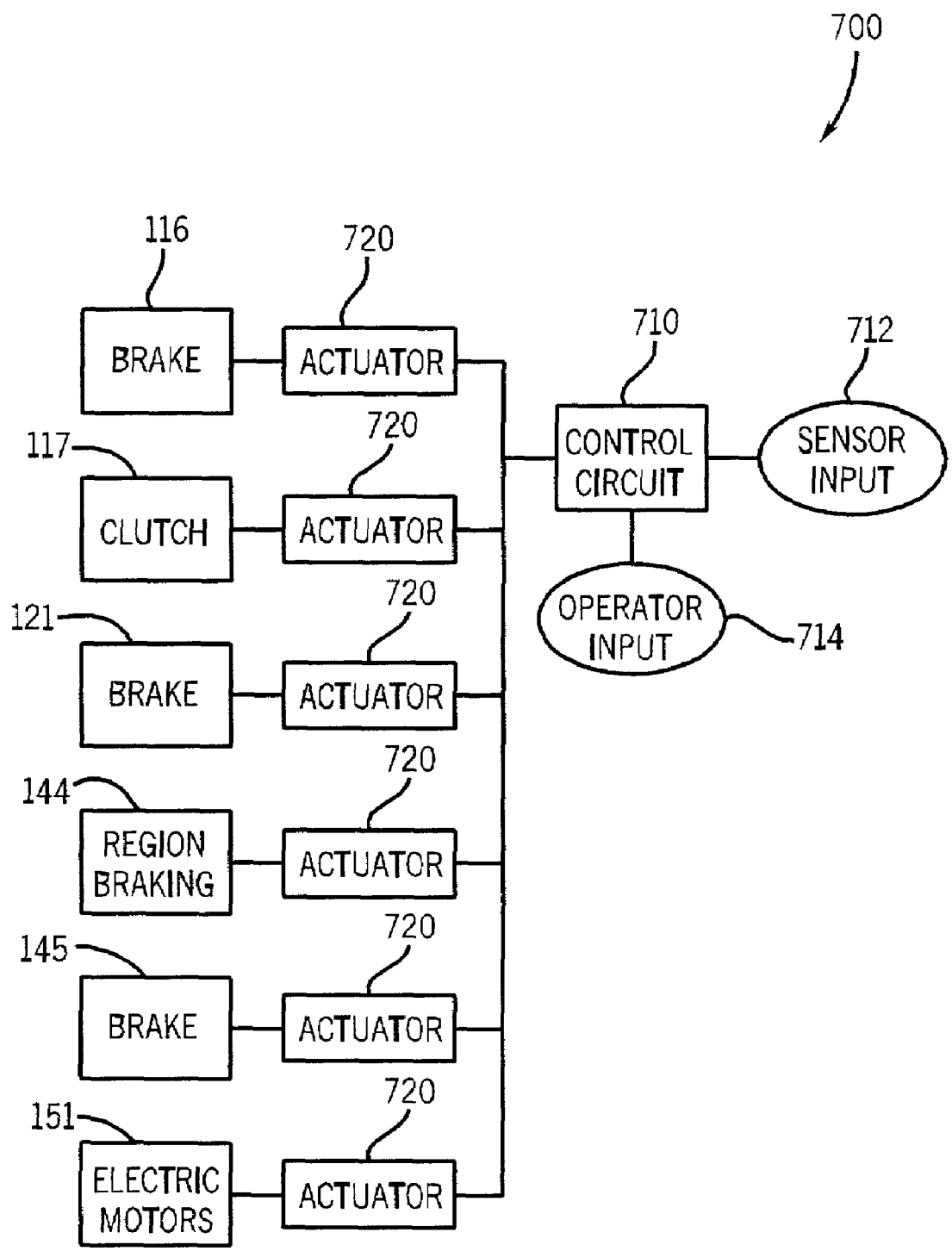
FIG. 7 is a schematic illustration for a control system for the hybrid drive system.

FIG. 7 is a schematic illustration of a control system 700 for the hybrid drive. The control system can include a control circuit 710 and actuators 720.

Control circuit 710 receives sensor inputs 712 and operator inputs 713. The control circuit can control the operation of vehicle 100 based on a combination of sensor inputs 712 and operator inputs 713. Sensor inputs 712 can include sensing the current speed of the vehicle, whether the vehicle is turning, any slippage occurring at the wheels, and any other input that could effect the amount of rotational mechanical energy that should be applied to the wheels. Operator inputs 713 can include pressing the accelerator, turning the wheel, indicating a slip situation, or any other input that could affect the amount of rotational mechanical energy that should be applied to the wheels.

The inputs are utilized by control circuit 710 to determine the combination of signals that are need to satisfy current needs based on the combination of inputs. Following this determination, control circuit 710 can send signals to actuators 720 to control their associated device. Examples of associated devices can include secondary generator brake 116, prime mover clutch 117, electric motors 141, drive shaft clutch 121 and multi-input drive unit brake 145. Greater or fewer devices can be included in control system 700 as needed.

Figure 8:
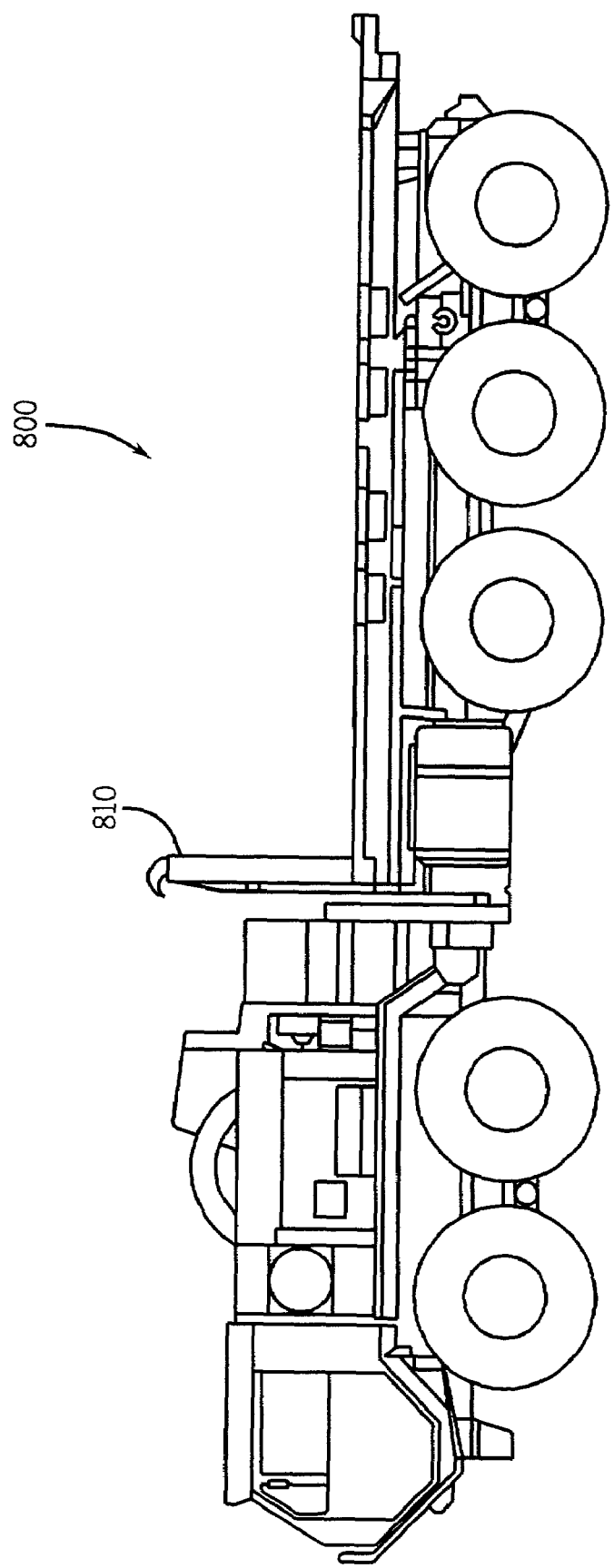
FIG. 8 is a schematic view of a vehicle including a palletized load handling system.

FIG. 8 is a perspective view of a vehicle 800 including a palletized load handling system 810. According to an exemplary embodiment, vehicle 800 further a hybrid electric drive including at least one hybrid drive axle assembly 130, described with reference to FIG. 1.

Advantageously, palletized load handling system can be powered by a prime mover 211 through a power take off assembly 250, described with reference to FIG. 2. Prime mover 211 can be run at an optimal speed to provide palletized load handling system with peak power available from prime mover 211.

Advantageously, wherein a palletized load is being lifted, a hybrid drive axle assembly can be utilized to slowly creep vehicle 800 backwards underneath a palletized load while it is being lifted by palletized load handling system 810. Because prime mover 211 output is independent of vehicle speed, as described with reference to FIG. 2, there is no drop in power available to palletized load handling system 810 while the vehicle is moving slowly.

Although the present system has been described with reference to preferred embodiments, those skilled in the art will recognize that changes may be made in form and detail without departing from the spirit and scope of the system. Because the technology of the present system is relatively complex, not all changes in the technology are foreseeable. The present system described with reference to the preferred embodiments and set forth in the following claims is manifestly intended to be as broad as possible. For example, unless specifically otherwise noted, claims reciting a single particular element also encompass a plurality of such elements.

What is claimed is:

1. A work vehicle comprising:
    an engine;
    a first generator coupled to the engine;
    a drive shaft coupled to the engine;
    a drive axle coupled to the drive shaft;
    first and second wheel ends coupled to the drive axle;
    first and second wheels coupled to the associated first and second wheel ends;
    a wheel end drive assembly coupled to at least one wheel end, the wheel end drive assembly comprising:
        an electric motor powered by the first generator,
        a planetary gearset having a first input coupled to the drive axle, a second input coupled to the electric motor, and an output;
    a second generator mechanically coupled to the engine;
    a drive control unit configured to control the engine and the electric motor and to generate a control signal based upon at least one of torque and speed requirements of the work vehicle; and
    a central tire inflation system coupled to the drive control unit and configured to regulate tire pressure based at least in part upon the control signal.

2. The work vehicle of claim 1, wherein the work vehicle includes:
    a series mode of operation, wherein the work vehicle is driven exclusively by the electric motor; and
    a parallel mode of operation, wherein the work vehicle is driven by a combination of the engine and the electric motor.

3. The work vehicle of claim 1, where the second generator is configured to synchronize system inertia during a transition from series mode to parallel mode.

4. The work vehicle of claim 1, wherein the work vehicle includes a wheel end drive assembly associated with each wheel of the vehicle.

5. The work vehicle of claim 1, wherein the work vehicle includes a drive shaft clutch disposed along the drive shaft, wherein the drive shaft clutch is configured to actuate between an engaged state to rotationally hold the drive shaft and disengaged state.

6. The work vehicle of claim 1, wherein the work vehicle includes a power storage system.

7. The work vehicle of claim 5, wherein the work vehicle includes a hybrid drive control unit configured to:
    generate a hybrid drive control signal based upon torque and speed requirements of the vehicle.

8. The work vehicle of claim 7, further comprising: a drive shaft clutch control unit configured to engage or disengage the drive shaft clutch based upon the hybrid drive control signal.

9. The work vehicle of claim 7, wherein the hybrid drive control unit is configured to generate a signal during a turning operation to increase power supplied to the wheel end located on the outside of a turning radius.

10. The work vehicle of claim 6, wherein the work vehicle includes a regenerative breaking system electrically coupled to the power storage system and disposed at the wheel.

11. A work vehicle comprising:
    an engine;
    a motor/generator coupled to the engine;
    a generator mechanically coupled to the engine;
    a drive shaft coupled to the engine;
    a drive axle coupled to the drive shaft;
    first and second wheel ends coupled to the drive shaft;
    first and second wheels coupled to the associated first and second wheel ends;
    a wheel end drive assembly coupled to at least one wheel end, the wheel end drive assembly comprising:
        an electric motor disposed external to the wheel end powered by the generator,
        a planetary gearset disposed external to the wheel end, the planetary gearset having a first input coupled to the drive shaft, a second input coupled to the electric motor, and an output coupled to the drive axle;
    a drive control unit configured to control the engine and the electric motor and to generate a control signal based upon at least one of torque and speed requirements of the work vehicle; and
    a central tire inflation system coupled to the drive control unit and configured to regulate tire pressure based at least in part upon the control signal.

12. The work vehicle of claim 11, wherein the work vehicle includes a drive shaft clutch disposed along the drive shaft, wherein the drive shaft clutch is configured to actuate between an engaged state to rotationally hold the drive shaft and disengaged state.

13. The work vehicle of claim 11, wherein the work vehicle includes a power storage system.

14. The work vehicle of claim 12, wherein the work vehicle includes a hybrid drive control unit configured to:
    generate a hybrid drive control signal based upon torque and speed requirements of the vehicle.

15. The work vehicle of claim 14, further comprising: a drive shaft clutch control unit configured to engage or disengage the drive shaft clutch based upon the hybrid drive control signal.

16. The work vehicle of claim 13, wherein the work vehicle includes a regenerative breaking system electrically coupled to the power storage system and disposed at the wheel.

17. A vehicle comprising:
    a prime mover;
    a first generator mechanically coupled to the prime mover;
    a second generator mechanically coupled to the prime mover;
    a first multi-input drive unit having at least first and second rotational inputs and at least one rotational output, wherein the first rotational input is coupled to the prime mover;
    a first electric motor mechanically coupled to the second rotational input and electrically coupled to the first generator; and a first pair of vehicle drive wheels coupled to the rotational output;

a drive control unit configured to control the prime mover and the first electric motor and to generate a control signal based upon at least one of torque and speed requirements of the vehicle; and a central tire inflation system coupled to the drive control unit and configured to regulate tire pressure based at least in part upon the control signal.

18. The vehicle of claim 17, further comprising:

a second multi-input drive unit having at least first and second rotational inputs and at least one rotational output, wherein the first rotational input of the second multi-input drive unit is coupled to the prime mover;

a second electric motor mechanically coupled to the second rotational input of the second multi-input drive unit and electrically coupled to the first generator; and a second pair of vehicle drive wheels coupled to the rotational output of the second multi-input drive unit.

19. The vehicle of claim 18, further comprising at least two axles, each having a differential to couple respective pairs of the drive wheels to the rotational outputs of the respective multi-input drive units.

20. The vehicle of claim 18, further comprising:

a third multi-input drive unit having at least first and second rotational inputs and at least one rotational output, wherein the first rotational input of the third multi-input drive unit is coupled to the prime mover;

a third electric motor mechanically coupled to the second rotational input of the third multi-input drive unit and electrically coupled to the generator; and a third pair of vehicle drive wheels coupled to the rotational output of the second multi-input drive unit.

21. The vehicle of claim 19, further comprising four wheel end reductions each for coupling a respective drive wheel to its respective differential.

22. The vehicle of claim 19, further comprising an earth working implement moveable by the vehicle.

23. The vehicle of claim 19, further comprising a snow removal device powered by the prime mover.

24. The vehicle of claim 19, further comprising a trash or garbage handling device.

25. The vehicle of claim 20, further comprising at least three axles, each having a differential to couple respective pairs of the drive wheels to the rotational outputs of the respective multi-input drive units.

26. The vehicle of claim 19 or 25, wherein the axles are configured to independently suspend each of the associated drive wheels.

27. The vehicle of claim 19 or 24, further comprising a multi-speed gearbox mechanically coupled between the prime mover and the first multi-input drive unit.

28. The vehicle of claim 19 or 25, wherein at least one of the electric motors is configured to also function as a generator.

29. The vehicle of claim 19 or 25, further comprising at least one braking device coupled to each drive wheel.

30. The vehicle of claim 25, further comprising four wheel end reductions each for coupling a respective drive wheel to its respective differential.

31. The vehicle of claim 25, further comprising a pump coupled to the prime mover.

32. The vehicle of claim 31, wherein the pump is one of a hydraulic fluid pump and a water pump.

33. The vehicle of claim 31, further comprising a water spraying device coupled to the pump.

34. The vehicle of claim 32, further comprising a pallet loading system coupled to the pump.

35. A work vehicle comprising:

an engine;

a generator coupled to the engine;

a second generator mechanically coupled to the engine;

a drive shaft coupled to the engine;

a drive axle coupled to the drive shaft;

first and second wheel ends coupled to the drive axle;

first and second wheels coupled to the associated first and second wheel ends;

a wheel end drive assembly coupled to at least one wheel end, the wheel end drive assembly comprising:

an electric motor powered by the generator, a planetary gearset, the planetary gearset having a first input coupled to the drive axle, a second input coupled to the electric motor, and an output, and a planetary reduction gear having an input coupled to the output of the planetary gearset and an output coupled to the wheel end;

a central tire inflation system including:

an air supply source;

an air manifold;

an inflatable tire coupled to the air manifold and disposed on the wheel;

a central tire inflation system control unit configured to generate a central tire inflation system control signal, wherein the air manifold regulates the air supplied to the wheel in response to the control signal; and a hybrid drive control unit configured to generate a hybrid drive control signal to control the engine and the electric motor and to based upon torque and speed requirements of the work vehicle, wherein the central tire inflation system control unit is configured to regulate tire pressure based at least in part upon the hybrid drive control signal.

36. The work vehicle of claim 35, wherein the work vehicle includes a wheel end drive assembly associated with each wheel on the vehicle.

37. The work vehicle of claim 35, wherein the work vehicle includes a drive shaft clutch disposed along the drive shaft, wherein the drive shaft clutch is configured to actuate between an engaged state to rotationally hold the drive shaft and disengaged state.

38. The work vehicle of claim 35, including a drive shaft clutch control unit configured to engage or disengage the drive shaft clutch based upon the hybrid drive control signal.

39. The work vehicle of claim 35, wherein the central tire inflation system control unit is configured to generate a signal to optimize tire pressure based on the hybrid drive signal and a user supplied input.

40. The work vehicle of claim 35, wherein the hybrid drive control unit is configured to generate a signal during a turning operation to increase power supplied to the wheel end located on the outside of a turning radius.

41. The work vehicle of claim 35, wherein the work vehicle includes a power storage system.

42. The work vehicle of claim 41, wherein the work vehicle includes a regenerative breaking system electrically coupled to the power storage system and disposed at the wheel.

43. A work vehicle comprising:

an engine;

a generator coupled to the engine;

a second generator mechanically coupled to the engine;

a drive shaft coupled to the engine;

a drive axle coupled to the drive shaft;

first and second wheel ends coupled to the drive axle;

first and second wheels coupled to the associated first and second wheel ends;

a wheel end drive assembly coupled to at least one wheel end, the wheel end drive assembly comprising:

an electric motor powered by the generator, a planetary gearset, the planetary gearset having a first input coupled to the drive axle, a second input coupled to the electric motor, and an output;

an ancillary equipment coupled to the drive shaft, a drive control unit configured to control the engine and the electric motor and to generate a control signal based upon at least one of torque and speed requirements of the work vehicle; and a central tire inflation system coupled to the drive control unit and configured to regulate tire pressure based at least in part upon the control signal.

44. The work vehicle of claim 43, wherein the work vehicle includes:

a hydraulic pump coupled to the drive shaft so as to be powered by the drive shaft; and a lift coupled to the hydraulic pump so as to be driven by the hydraulic pump.

45. The work vehicle of claim 43, wherein the ancillary equipment includes a high volume water pump coupled to the drive shaft so as to be powered by the drive shaft.

46. The work vehicle of claim 43, wherein the ancillary equipment includes a cement mixer drum coupled to the drive shaft so as to be powered by the drive shaft.

47. The work vehicle of claim 43, the work vehicle includes a wheel end drive assembly associated with each wheel of the vehicle.

48. The work vehicle of claim 43, wherein the work vehicle includes a drive shaft clutch disposed along the drive shaft, wherein the drive shaft clutch is configured to actuate between an engaged state to rotationally hold the drive shaft and disengaged state.

49. The work vehicle of claim 43, wherein the hybrid drive control unit is configured to generate a signal during a turning operation to increase power supplied to the wheel end located on the outside of a turning radius.

50. The work vehicle of claim 43, wherein the work vehicle includes a power storage system.

51. The work vehicle of claim 48, wherein the work vehicle includes a hybrid drive control unit configured to:

generate a hybrid drive control signal based upon torque and speed requirements of the vehicle.

52. The work vehicle of claim 48, wherein the hybrid drive control unit is configured to generate a hybrid drive control signal to engage the shaft clutch to transfer full engine horsepower to ancillary equipment and increase power to the electric motors to move the vehicle at a slow rate of speed.

53. The work vehicle of claim 51, including a drive shaft clutch control unit configured to engage or disengage the drive shaft clutch based upon the hybrid drive control signal.

54. The work vehicle of claim 50, wherein the work vehicle includes a regenerative breaking system electrically coupled to the power storage system and disposed at the wheel.

* * * * *